Jan. 2, 1934.  W. S. HARLEY  1,941,801
MOTORCYCLE PROTECTING GUARD
Filed Jan. 5, 1933
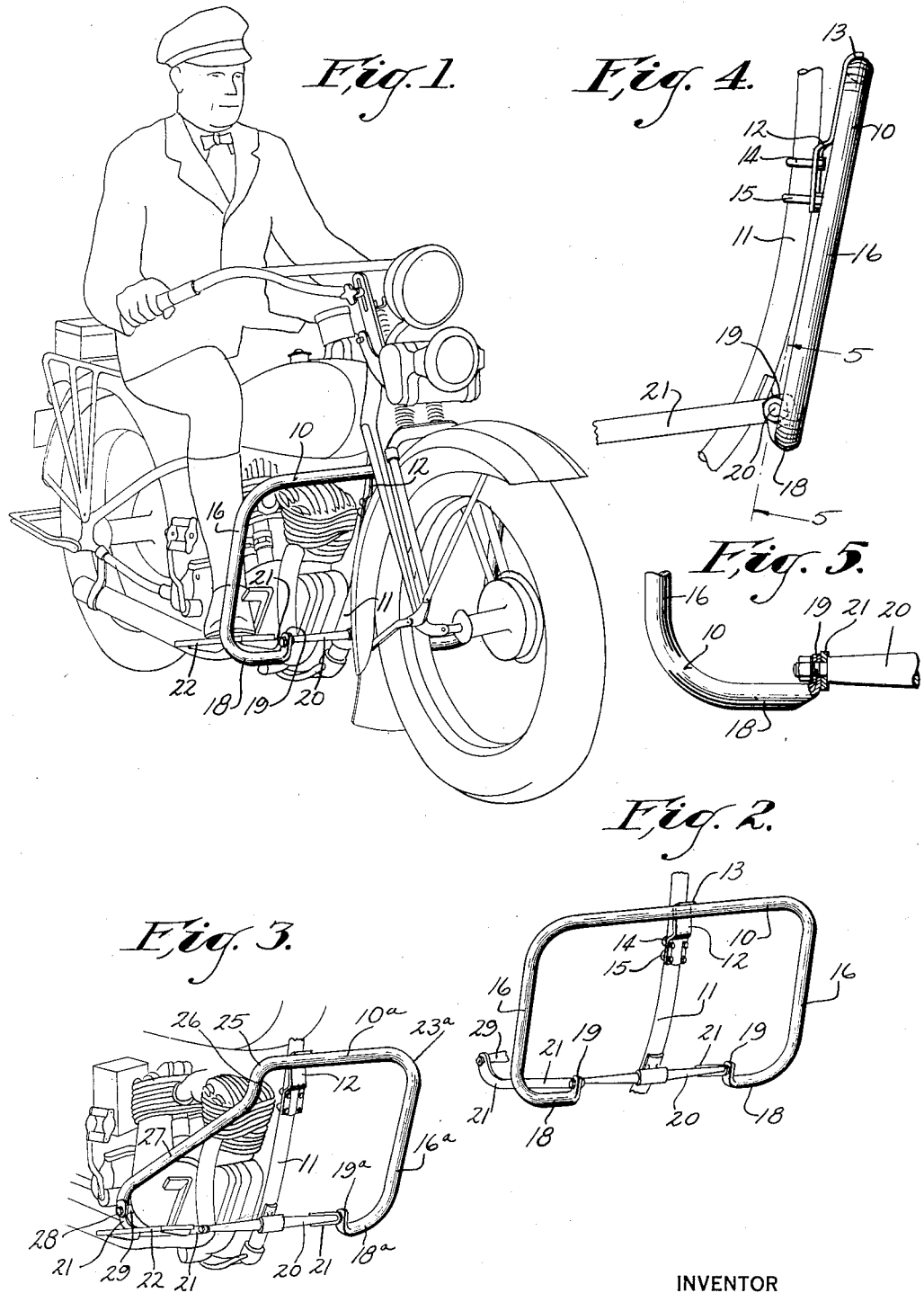
INVENTOR
William S. Harley
BY
Wheeler, Wheeler and Wheeler
ATTORNEYS Patented Jan. 2, 1934

1,941,801

UNITED STATES PATENT OFFICE 1,941,801

MOTORCYCLE PROTECTING GUARD

William S. Harley, Milwaukee, Wis., assignor to Harley-Davidson Motor Company, Milwaukee, Wis., a corporation of Wisconsin Application January 5, 1933. Serial No. 650,252

6 Claims. (Cl. 208—150)

My invention relates to improvements in motorcycle protecting guards.

Heretofore it has been common to provide motorcycles with wind shields, rain shields, and auxiliary leg protecting mud guards, but such guards have not assisted in protecting either the rider or the motorcycle from injury due to collisions and upsets. In fact, they have increased the hazards by obstructing vision and causing additional entanglement of the rider in the wreckage when accidents occur.

Therefore, accidents have frequently resulted in a breaking of the legs of a motorcycle rider between the ankle and the knee, and where the motorcycle is thrown upon its side, serious concussions and contusions usually occur by reason of the head of the rider being thrown in contact with a hard surface or the body of the rider propelled along such surface by momentum.

My invention differs from the guards above referred to in that it is not intended to contribute to the normal comfort of the rider of a motorcycle, but, on the contrary, has for its object the protection of the rider and also the motorcycle from serious injury to the person or damage to the machine during accidents.

It is my object to provide a motorcycle with a non-vision obstructing guard of great strength and resistance to shock and capable of not only protecting the legs of the rider from breakage during collisions, but also capable of serving as a shoe or runner to support both the motorcycle and the rider while propelled by momentum along a roadway or other surface after an upset.

In the drawing:

Figure 1 is a perspective view of a motorcycle equipped with my invention as it appears under normal conditions of use.

Figure 2 is a detail view showing my improved guard associated with the lower front frame fork.

Figure 3 is a fragmentary view of the lower central portion of a motorcycle frame showing a slight modification of my invention adapted for use when the motorcycle is intended to be connected with a side car.

Figure 4 is a side elevation of my improved guard showing also fragments of the connected motorcycle frame members.

Figure 5 is a detail sectional view drawn generally to line 5—5 of Figure 4.

Like parts are identified by the same reference characters throughout the several views.

A cross bar 10 of relatively large diameter and sufficient strength for the purposes herein stated is secured to the lower arm 11 of the front frame fork by a suitable bracket 12 which has a curved upper end portion 13 welded or otherwise secured substantially at the center of the cross bar 10 and having its lower end contoured to fit the bar 11 and clamped thereto by U-shaped clamping bolts 14 and nuts 15.

The end portions of the bar 10 are elbowed and downwardly extended to form side arms 16, the lower end portions 18 of which are inturned and provided with flattened up-turned and rearwardly inclined extremities 19 which are suitably apertured to receive the reduced and threaded ends of the front cross bar 20 of the step supporting frame of the motorcycle. The reduced and threaded ends of this step frame bar 20 preferably extend through apertures in the side members 21 of the step supporting frame and through the up-turned extremities 19 of the guard. The steps 22 are at the rear of and slightly above the level of the inturned guard connecting portions 18. The side arms 16 of the guard are preferably laterally offset beyond all associated parts of the motorcycle.

The cross bar 10 is supported by the bracket 12 in a shin protecting position. The side arms 16 extend upwardly and forwardly from their connections with the step supporting frame and serve as braces for the outer ends of the bar 10, and as it is located at a substantial distance in front of the legs of the rider, it will be sufficiently braced to adequately protect his legs from injury.

The strength of the bar is such that if the motorcycle is thrown upon its side, it, and the rider, will be supported by one of the arms 16. This guard bar also serves to protect all portions of the motorcycle in the rear of the front wheel, the transversely extending portion of the bar being at a level adjacent to that of the top of the engine and in a position to absorb collision shocks, which might otherwise break the engine and associated parts. The front wheel and its fork may be completely buckled or destroyed without otherwise seriously damaging the motorcycle, and this is accomplished without interfering in any way with the ordinary operation of the motorcycle or with starting, mounting, or dismounting operations. The lower handle bar will swing into a position to further protect the body of the rider, and by shifting his lower hand toward the center of the handle bar he may wholly avoid injury and may support his body, head, and shoulders out of contact with the ground by means of his other hand and arm. In fact, he will tend involuntarily to grip the upper end of the handle bar and support himself thereby in a raised position.

The arm 16 will ordinarily meet with unequal resistance when in contact with the roadway, and will have a tendency to turn the motorcycle to a position where the arm 16 in contact with the roadway will extend longitudinally of the line of travel and will serve as a runner shoe upon which both the motorcycle and the rider may slide along the roadway until the momentum energy is exhausted. In fact, one of the arms 16 may be ground away to a considerable extent before this sliding motion ceases without any injury to the rider and little damage to the motorcycle other than abrasion of the arm.

When my invention is to be applied to a motorcycle intended for use in association with a side car, I provide a guard having a top bar 10a which has an elbow 25 in close proximity to the connecting bracket 12 on the side to be occupied by the side car. From the elbow the bar has a downwardly extending short arm 26 and an oblique downwardly and rearwardly extending arm 27 having a flattened extremity bolted at 28 to the end of the rear cross bar 29 of the step supporting frame.

At the side opposite that occupied by the side car the guard has an elbow 23a and a downwardly extending arm 16a, inwardly extending portion 18a, and flattened extremity 19a connected with the front cross bar 20 of the step supporting frame substantially as described with reference to the structure shown in Figure 2. The portion 27 of the modified guard shown in Figure 3 serves as a brace which provides adequate support for the laterally offset guard arm 16a, whereby it will not be wrenched from its connection with the motorcycle frame when brought forcibly in contact with an obstruction in case of an accident.

While I have shown and described my improved guard as a removable attachment for a motorcycle frame, it will be understood that it is not material to the major features of invention herein claimed whether the guard is made removable or whether it is made a permanent or integral part of an otherwise ordinary motorcycle frame. If the motorcycle is to be used either as an ordinary motorcycle or combined with a side car when occasion requires, it will then be desirable to construct the guard or guards as attachments, thereby making it possible to use guards of the type shown in Figures 1 and 2 interchangeable with guards of the type shown in Figure 3.

I claim:

1. The combination with a motorcycle, of a transversely disposed leg protecting guard in a shin protecting position and of sufficient strength to protect the shins of the rider in the event of accident, said guard and its connections being located wholly in advance of the foot supporting portion of the step in a position of non-interference with lateral movements of the legs and feet of the rider when mounting or dismounting.

2. The combination with a motorcycle, of a transversely extending shin protecting guard, a laterally offset brace for one end of the guard connected with the front end of the step supporting frame, and a brace for the other end of the guard, located within the space occupied by the legs of the rider and connected with the rear end of the step supporting frame.

3. The combination with a motorcycle adapted for connection with a side car, of a transversely extending shin protecting guard intermediately secured to the motorcycle frame in the vicinity of the front wheel, with one end extending laterally of the frame in the vicinity of the front end of the step, and the other end having less lateral projection and braced from a more rearward portion of the frame in closer proximity to its central axis.

4. A motorcycle attachment comprising a shin protecting guard bar of a generally U-shaped form, secured to the motorcycle frame in an inverted position with the side arms offset with reference to the space above the steps, and the central portion of the bar extending across the frame in a shin and knee protecting position at a substantial distance above and in front of the space occupied by the feet and ankles of the rider, said bar being of sufficient strength to resist collision shocks and to support associated portions of a fallen motorcycle and of the rider out of contact with the ground while propelled thereon by momentum.

5. A motorcycle attachment comprising a transversely extending shin protecting guard having its middle portion secured to the motorcycle frame in front of the space normally occupied by the shins of the rider, and its end portions extending downwardly in offset relation to the space in front of and above the steps, said end portions being connected with the frame in bracing relation to the shin guarding portions, and said guard being of sufficient strength to resist collision shocks and support the associated parts of an overturned motorcycle out of contact with the ground while propelled thereon by momentum.

6. A motorcycle provided with a permanently attached transversely extending collision resisting guard positioned in front of the engine, and across the space normally occupied by the legs of the rider above the ankle, and having its laterally projecting portions braced from the step frame, the space at the sides of the steps being otherwise unobstructed and free for mounting and dismounting operation.

WILLIAM S. HARLEY.